United States Patent [19]
Campillo et al.

[11] 3,935,545
[45] Jan. 27, 1976

[54] METHOD AND APPARATUS FOR REDUCING DIFFRACTION-INDUCED DAMAGE IN HIGH POWER LASER AMPLIFIER SYSTEMS

[75] Inventors: Anthony J. Campillo; Brian E. Newnam; Stanley L. Shapiro; N. James Terrell, Jr., all of Los Alamos, N. Mex.

[73] Assignee: The United States of America as represented by the United States Energy Research and Development Administration, Washington, D.C.

[22] Filed: Jan. 2, 1975

[21] Appl. No.: 538,225

[52] U.S. Cl. .......................... 331/94.5 C; 350/319
[51] Int. Cl.² ............................................. H01S 3/02
[58] Field of Search ............... 331/94.5; 350/319

[56] References Cited
UNITED STATES PATENTS
3,362,285  1/1968  Hora .......................... 331/94.5 T OTHER PUBLICATIONS
Campillo et al., Diffraction Effects in the Design of High-Power Laser Systems, Appl. Phys. Lett., Vol. 23, No. 2, (July 15, 1973), pp. 85–87.

*Primary Examiner*—William L. Sikes
*Attorney, Agent, or Firm*—Dean E. Carlson; Edward C. Walterscheid

[57] ABSTRACT

Self-focusing damage caused by diffraction in laser amplifier systems may be minimized by appropriately tailoring the input optical beam profile by passing the beam through an aperture having a uniform high optical transmission within a particular radius $r_o$ and a transmission which drops gradually to a low value at greater radii. Apertures having the desired transmission characteristics may readily be manufactured by exposing high resolution photographic films and plates to a diffuse, disk-shaped light source and mask arrangement.

5 Claims, 2 Drawing Figures

METHOD AND APPARATUS FOR REDUCING DIFFRACTION-INDUCED DAMAGE IN HIGH POWER LASER AMPLIFIER SYSTEMS

BACKGROUND OF THE INVENTION

The invention described herein was made in the course of, or under, a contract with the U.S. ATOMIC ENERGY COMMISSION. It relates to apparatus and method for minimizing self focusing caused by diffraction in high-power laser amplifier systems.

High-power laser amplifier systems, e.g., Nd:glass, are plagued by damage to components which often results from selffocusing. Self-focusing in such systems can be prematurely induced by severe spatial modulation of the beam intensity profile. These oscillations result from diffraction caused by sharp truncation of the beam at the input edges of rods, disks, and other components. Severe truncation is difficult to avoid since it is desirable for the incident beam to fill the amplifier apertures to obtain maxiumum extraction of energy. An intensity profile which minimizes damage caused by diffraction-produced hot spots and still utilizes nearly all of the useful aperture of laser amplifiers has been disclosed by Campillo et al. in "Fresnel Diffraction Effects in the Design of High-power Laser Systems," 23 Appl. Phys. Lett. 85 (1973). Diffraction smoothing apertures are known in the art.

SUMMARY OF THE INVENTION

An optical beam profile which minimizes damage caused by diffraction-produced hot spots and still utilizes nearly all of the useful aperture of laser amplifiers may readily be generated by the use of a "soft" or "apodized" aperture. Such an aperture has a uniform high optical transmission within a particular radius $r_0$ and a transmission which drops gradually to a low value at a specified greater radius. Typically, the central region has a uniform transmittance of nearly 100%, while the transmittance falls to $\sim 10^{-4}$ at the outer radii.

Soft apertures having transmission characteristics and damage threshold suitable for use in high-power laser amplifier systems may readily be produced using high resolution photographic films and plates which are exposed to a diffuse, white (or broad spectral band), disk-shaped light source and mask arrangement. Such a source is readily produced by illuminating a groundglass screen followed by a circular aperture. The light from this source illuminates a disk and then a photographic plate centered on a common axis with the aperture. Because of the finite size of the light source, the shadow cast by the disk on the film or plate has gentle rather than sharp edges. As a result, the film is unexposed at its center but gradually becomes highly exposed over the penumbra transition region. The developed negative has the requisite transmission characteristics and serves as the soft aperture.

Further reduction of the transmittance at the outer radial zone can be obtained by use of two separate apertures in series.

Diffraction and Soft Apertures

A soft aperture should have transmission decreasing radially in a smooth fashion from 100% in the central region to as near zero as can be arranged in the outermost region. A convenient representation of the transmission T of a soft aperture is given by $$T = [1 + e^{-S}(e^{r^2/w^2} - 1)]^{-2}$$

where $r$ is the radial distance on the aperture, $w$ is the spot-size radius in the case of Gaussian transmission ($S = 0$), and S is a shape factor characterizing the aperture.

For values of S greater than about 4, the 25% transmission point (effective radius) is at $r = w\sqrt{S}$ to a very high accuracy, and the transmission decreases from 76 to 25% over the radial distance (transition width) $w/\sqrt{S}$. Thus $w\sqrt{S}$ and $w/\sqrt{S}$ are two characteristic dimensions of the soft aperature. Such an aperture is useful in reducing diffraction problems for a distance (effective range) $L \sim w^2/\lambda$ for light wave of wavelength $\lambda$.

DESCRIPTION OF THE PREFERRED EMBODIMENT

Figure 1:
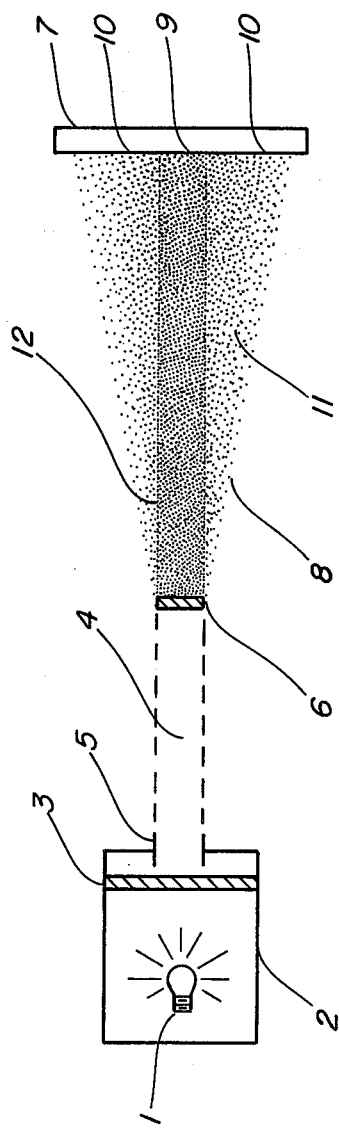
FIG. 1 is a schematic diagram of the method for preparing photographic film or plate soft apertures.

Soft aperture devices may readily and easily be fabricated on photographic films and plates in accordance with the penumbra technique shown schematically in FIG. 1. A penumbra is merely a space of partial illumination. White light source 1 in enclosure 2 illuminates ground-glass screen 3, resulting in a diffuse, disk-shaped light source 4 through circular aperture 5. Spaced a desired distance away and centered on the axis of aperture 5 is solid disk 6. Diffuse source 4 illuminates disk 6 and then photographic film or plate 7. Because of the finite size of diffuse light source 4, the shadow 8 cast by disk 6 on film 7 has gentle rather than sharp edges. Film 7 is not exposed at the center 9 because of shadow 12, but gradually becomes highly exposed over penumbra transition region 10 with the amount of exposure depending on the shading produced by penumbra 11. Since penumbra 11 increases in brightness radially outward from the axis of aperture 5 and disk 6, film 7 is more exposed as the radius of region 10 extends outwards. The developed negative then has the requisite transmission characteristics of a soft or apodized aperture, i.e., it has a uniform high optical transmission within a desired central radius which drops gradually to some desired low value at larger radii.

It is apparent that the aperture size may be made to vary widely as may the desired transmission falloff, since a wide range of choices are available for producing them. Among the parameters that may be varied are the relative spacings between aperture 5, disk 6, and film 7, the diameters of diffuse light source 4 and disk 6, the exposure times of film 7, the different varieties of film or photographic plates that may be used, and the various film developmental techniques.

As an example of an aperture useful in the large 51 mm diameter Nd:glass laser amplifier system ($\lambda = 1.064$ $\mu$m) at Los Alamos Scientific Laboratory, Los Alamos, New Mexico, the values $S = 16$ and $w = 5.0$ mm give transmission values $T = 0.764$ at $r = 18.75$ mm and $T = 0.250$ at $r = 20.0$ mm, with a useful pathlength of $L \sim 23.5$ m. When a film soft aperture having these characteristics was placed in front of the second 51 mm diameter glass amplifier rod, an immediate improvement in the beam wavefront quality, as witnessed by burn patterns, was observed further along the amplifier chain. In this system, significant damage due to self focusing on diffraction ripples had occurred in the third amplifier rod at a power density of $3 \times 10^9$ W/cm$^2$. Use of the film soft aperture permits damage-free operation of the laser at twice this power level. Furthermore, the resultant improved beam quality allows more energy to be focused on a target.

One film used in the foregoing examples is Microfile AHU, a high-resolution antihalation film commonly used for photographic slides manufactured by Eastman Kodak Corporation. Apertures have also been successfully fabricated with photographic plates, e.g., Kodak's Medium Contrast Lantern Slide plates.

Parameters for a particular plate aperture involved light source to disk to film plane distances of 38.1 cm and 62.2 cm, respectively. The disk diameter was 1.8 cm and that of the light source was 0.8 cm. A 250 W opal glass-covered light bulb was operated at 90 V for 2 sec exposure. The resulting S parameter was 21 with a uniform central diameter of 37 mm.

A radial scan of the transmittance of a film soft aperture performed at 1.06 $\mu$m with a continuous-wave YAG laser having a beam diameter of about 1.0 mm, FWHM, showed that the transmittance fluctuated around 90% in the center of the aperture and fell to less than 0.06% at the edges. Oscillations in transmittance noted across the center of the aperture appear to be a consequence of variable interference between the film surfaces because of nonuniformities in film thickness. When the film was placed in a liquid, e.g., glycerol, having a matching index of refraction and sandwiched between two antireflection-coated optical flats, the oscillation disappeared (solid line of FIG. 2), and the transmittance in the center of the soft aperture increased to 96%. Matching the index of refraction of the liquid with that of the film prevents any possible self-focusing caused by intensity and phase fluctuations induced by the film and also reduces the reflection losses which is an important consideration when a soft aperture is used in a laser amplifier system.

Figure 2:
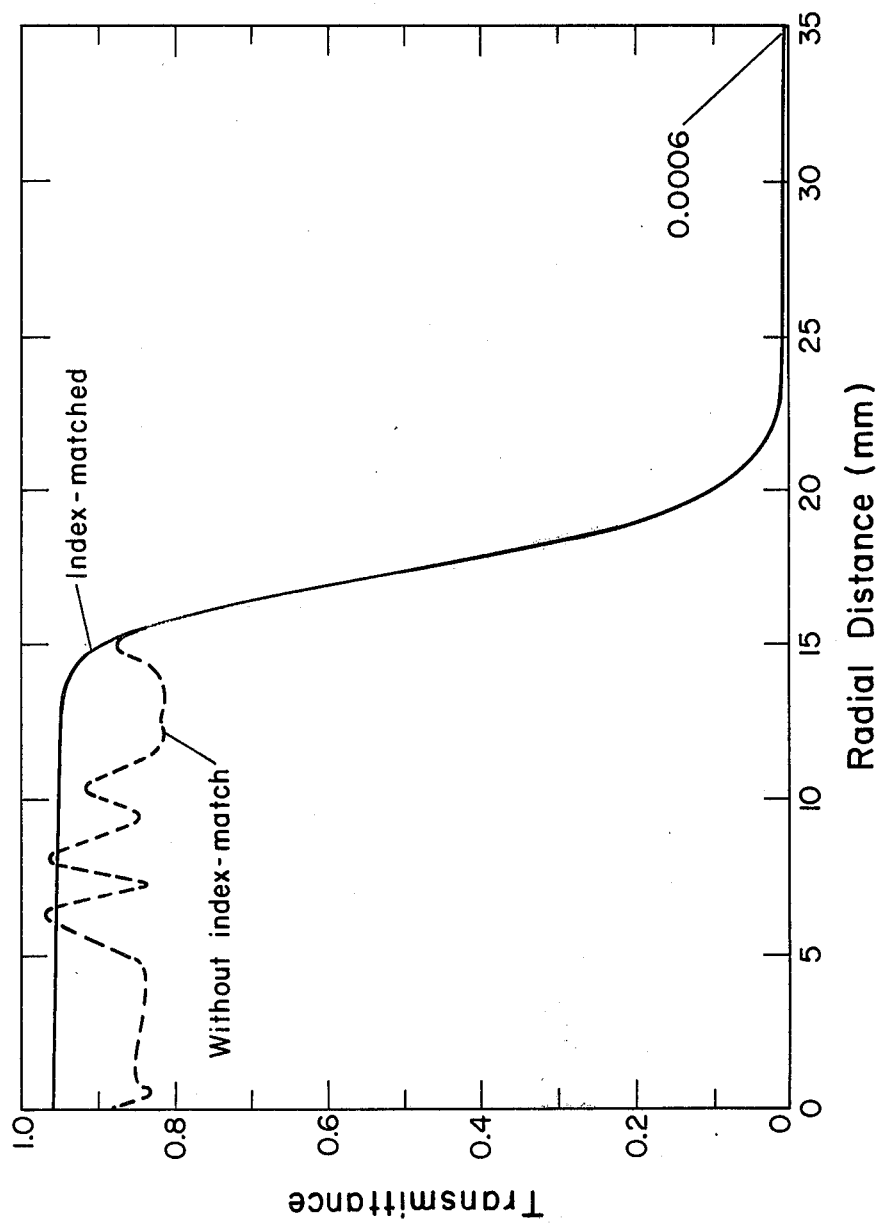
FIG. 2 shows the transmission characteristics of a film soft aperture. The solid line is with index matching and the dotted line is with no index matching.

The soft aperture with which the results of FIG. 2 were obtained tailors the intensity profile of a laser beam so that it effectively fills the aperture of a two-inch-diameter Nd:glass amplifier rod, while simultaneously reducing the intensity at the edge of the rod to the point where beam truncation is not harmful. The resulting laser beam can propagate a distance of approximately 40 meters without developing significant intensity fluctuations due to diffraction.

The damage threshold for this film soft aperture for a short, 1.06 $\mu$m laser pulse was measured by means of a mode-locked Nd:YAG oscillator-amplifier system. A spark gap and Pockels cell switch arrangement allowed a single 30-psec pulse to be used to ascertain damage effects. The clear area of the Microfile AHU negative damaged at an energy per unit area of 200 mJ/cm$^2$, while in the exposed areas of the film the damage threshold was measured to be 15 mJ/cm$^2$ in both the graded area and the most darkly exposed areas. Thus, a 30-psec duration pulse with 0.5 J distributed over the soft aperture will not exceed the measured damage threshold.

What we claim is:

1. A method for minimizing damage caused by diffraction-induced self focusing in high-power laser amplifier systems which comprises passing the input optical beam through a soft aperture having an optical transmission T given by
$$T = [1 + e^{-S}(e^{r/w} - 1)]^{-2}$$
where $r$ is the radial distance on the aperture, $w$ is the spot-size radius in the case of Gaussian transmission ($S = 0$), and S is a shape factor characterizing the aperture.

2. An article of manufacture useful as a soft aperture which comprises a developed high resolution photographic film or plate having an optical transmision T given by
$$T = [1 + e^{-S}(e^{r/w} - 1)]^{-2}$$
where $r$ is the radial distance from the center of said film or plate, $w$ is the spot radius in the case of Gaussian transmission ($S = 0$), and S is a shape factor characterizing the film or plate.

3. A method of forming a soft aperture which comprises (a) spacing a solid disk from a high-resolution photographic film or plate and (b) illuminating said disk with a source of diffuse white light having a suitable diameter whereby said disk casts a shadow having an outer penumbra region on said photographic film or plate.

4. The method of claim 3 wherein said source of diffuse light is formed by illuminating a glass screen in an enclosure having a circular aperture therein.

5. The method of claim 3 wherein said film or plate is in a liquid having a matching index of refraction.

* * * * *

UNITED STATES PATENT OFFICE
CERTIFICATE OF CORRECTION

Patent No. 3935545                        Dated January 27, 1976

Inventor(s) Anthony J. Campillo, Brian E. Newman, Stanley L. Shapiro, and James N. Terrell, Jr.

It is certified that error appears in the above-identified patent and that said Letters Patent are hereby corrected as shown below:

Claims 1 and 2 change the equation $"T = [1 + e^{-s}(e^{r/w} - 1)]^{-2}"$ to $--T = [1 + e^{-s}(e^{r^2/w^2} - 1)]^{-2}--$ In the specification Column 2 line 8 change the equation to read:

$--T = [1 + e^{-s}(e^{r^2/w^2} - 1)]^{-2}--$

Signed and Sealed this

*twenty-ninth* Day of *June 1976*

[SEAL]

Attest:

RUTH C. MASON
*Attesting Officer*

C. MARSHALL DANN
*Commissioner of Patents and Trademarks*